United States Patent [19]

McInnes

[11] Patent Number: 4,537,669

[45] Date of Patent: Aug. 27, 1985

[54] APPARATUS FOR CLEANING, PLATING AND/OR COATING ARTICLES

[76] Inventor: Robert McInnes, 4444 W. Bristol Rd., Flint, Mich. 48507

[21] Appl. No.: 600,795

[22] Filed: Apr. 6, 1984

[51] Int. Cl.³ ........................ B08B 3/06; B65G 49/02; C25D 17/20

[52] U.S. Cl. .................................... 204/201; 118/418; 134/134; 134/159; 204/213

[58] Field of Search ................ 204/201, 213; 118/418, 118/19; 427/242; 134/159, 134

[56] References Cited

U.S. PATENT DOCUMENTS

| | | | |
|---|---|---|---|
| 3,855,107 | 12/1974 | McInnes | 134/134 X |
| 3,926,666 | 12/1975 | McInnes | 134/134 X |
| 4,390,399 | 6/1983 | McInnes | 204/201 X |
| 4,399,828 | 8/1983 | Kontos | 118/418 X |

FOREIGN PATENT DOCUMENTS

| | | | |
|---|---|---|---|
| 2445102 | 4/1976 | Fed. Rep. of Germany | 118/19 |

*Primary Examiner*—Evan K. Lawrence

*Attorney, Agent, or Firm*—Barnes, Kisselle, Raisch, Choate, Whittemore & Hulbert

[57] ABSTRACT

Apparatus for cleaning, plating and/or coating articles comprising a container adapted to contain a liquid cleaning, plating or coating material. A barrel is at least partially submerged in the container and supported for rotation about its longitudinal axis. A novel support for the barrel comprises a pair of rings concentric with the barrel and suspended by a plurality of rollers. Laterally spaced stationary end walls are mounted in fixed positions covering the ends of the barrel. The barrel has end openings and the stationary end walls fit within the end openings. A novel discharge chute extends from inside the barrel to the exterior thereof.

28 Claims, 8 Drawing Figures

APPARATUS FOR CLEANING, PLATING AND/OR COATING ARTICLES

This invention relates to the cleaning, plating and/or coating of articles.

BACKGROUND OF THE INVENTION

In apparatus for cleaning, plating and/or coating articles of the type involved in this invention, a plurality of tank assemblies are provided through which articles to be processed are moved in sequence. Each tank assembly comprises a tank containing liquid cleaning, plating or coating material. A barrel is at least partially submerged in the liquid in each tank and is rotated about its longitudinal axis. The barrel has baffles on the interior thereof. When the barrel is rotated in one direction, the articles are agitated through the liquid, and when the barrel is rotated in the opposite direction, the articles are elevated and deposited on a chute for transfer to the next succeeding tank assembly.

Among the objects of this invention are to provide an improved barrel, chute, and barrel mounting structure.

SUMMARY OF THE INVENTION

In accordance with this invention, the apparatus for cleaning, plating and/or coating articles comprises a container adapted to contain a liquid cleaning, plating or coating material. A barrel is at least partially submerged in the container and supported for rotation about its longitudinal axis. A novel support for the barrel comprises a pair of rings which are concentric with the barrel and which are suspended by a plurality of rollers mounted for free rotation on a fixed frame. Laterally spaced stationary end walls are mounted in fixed positions covering the ends of the barrel. The barrel has end openings and the stationary end walls fit within the end openings. Cathode cables extend through openings in one or both of the end walls. Plating elements are fed by a conduit or conduits through one or both of the end walls to an anode basket inside the barrel. A novel discharge chute extends from inside the barrel to the exterior thereof. The chute has an opening to permit articles which accidentally drop into the chute during processing to fall back into the barrel. There is a closure to close the opening when the articles are discharged from the barrel. Means are provided to restrain the loss of liquid through the chute.

DETAILED DESCRIPTION

Figure 1:
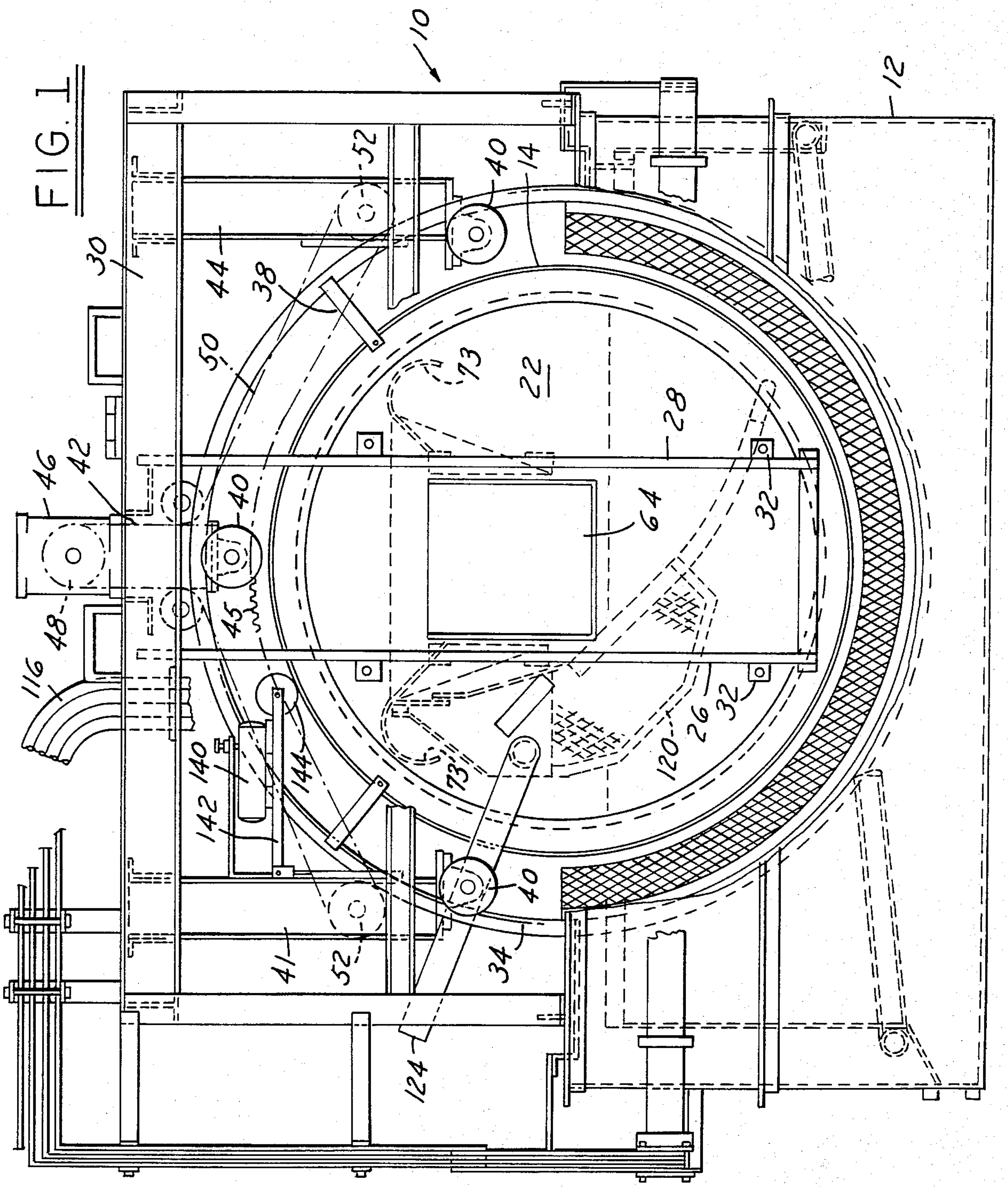
FIG. 1 is an elevational view of apparatus constructed in accordance with my invention, with certain details of the barrel, barrel mounting structure and stationary end wall omitted for clarity.

The apparatus of this invention can be used for cleaning alone (without electrodes for plating), plating alone, or coating alone (without electrodes for plating).

The apparatus shown in the drawings is used in connection with the zinc plating of articles, but it should be understood that it can be adapted to other types of plating. The articles to be plated are fed from a metering hopper periodically in a batch to a first tank assembly. After treatment in the first tank assembly, the articles are fed to a second tank assembly, and so on to successive tank assemblies in order. By this arrangement, each tank assembly performs a function on a batch of articles while the other tank assemblies are performing their functions on other batches of the articles.

One such tank assembly is described herein in detail in which plating is carried out and accordingly electric power and a supply of plating material, in this instance zinc balls, are required. Other tank assemblies in the series carry out other functions such as cleaning or rinsing and may not require electric power or a supply of plating material, but otherwise may be like the tank assembly described.

Figure 6:
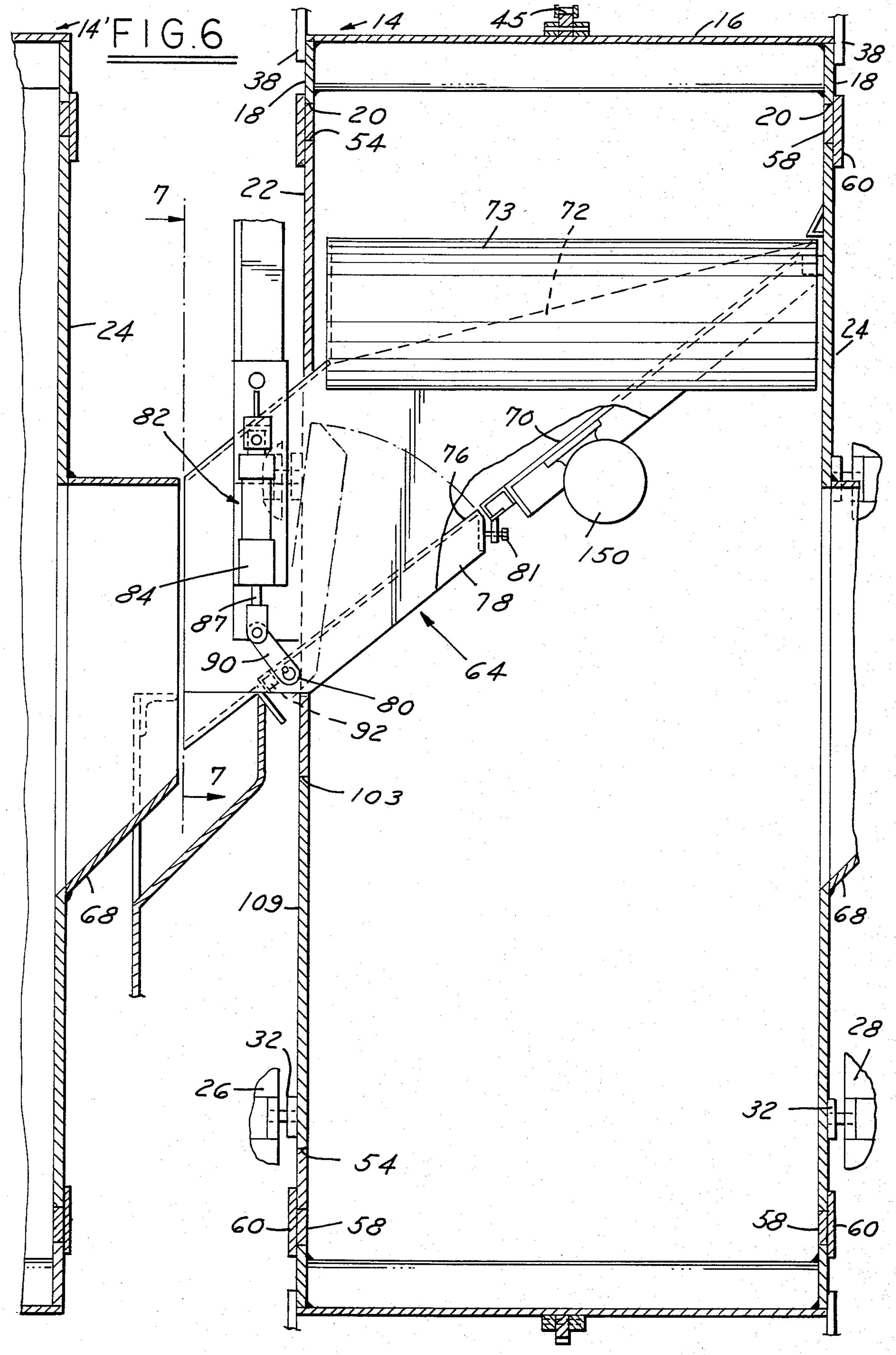
FIG. 6 is a vertical sectional view of the barrel, showing the chute and portions of another barrel of similar construction employed in the sequential cleaning, plating or coating of articles.

Referring now more particularly to the drawings, the tank assembly 10 includes a container 12 which is adapted to hold a treating or plating liquid, in this instance plating liquid. The tank assembly 10 also includes a barrel 14 which is generally cylindrical (FIGS. 1, 3 and 4) and has a cylindrical outer wall 16 (FIGS. 4 and 6). At the ends of the cylindrical wall 16 are radially inwardly extending walls 18 which define concentric circular end openings 20 (FIGS. 3 and 6).

Laterally spaced stationary end walls 22 and 24 cover the ends of the barrel. The end walls 22 and 24 are circular and are formed to fit within the end openings 20 (FIGS. 3 and 6). The end walls are rigidly secured to frame elements 26 and 28 of the main frame 30 by brackets 32 (FIGS. 1 and 3).

The barrel is mounted for rotation on the main frame 30 and, to this end, the barrel is provided with a pair of laterally spaced rings 34, 36 which incircle the barrel in concentric relation therewith and are rigidly secured to the barrel by radial attaching elements 38 (FIGS. 1–4). A plurality of rollers 40 are mounted for free rotation on frame elements 41, 42 and 44 of the main frame 30 in arcuately spaced relation. The rings 34, 36 are suspended on the rollers. The rollers are located in positions spaced above the liquid in the container and support the barrel so that its lower portion is submerged in the liquid in the container.

Figure 3:
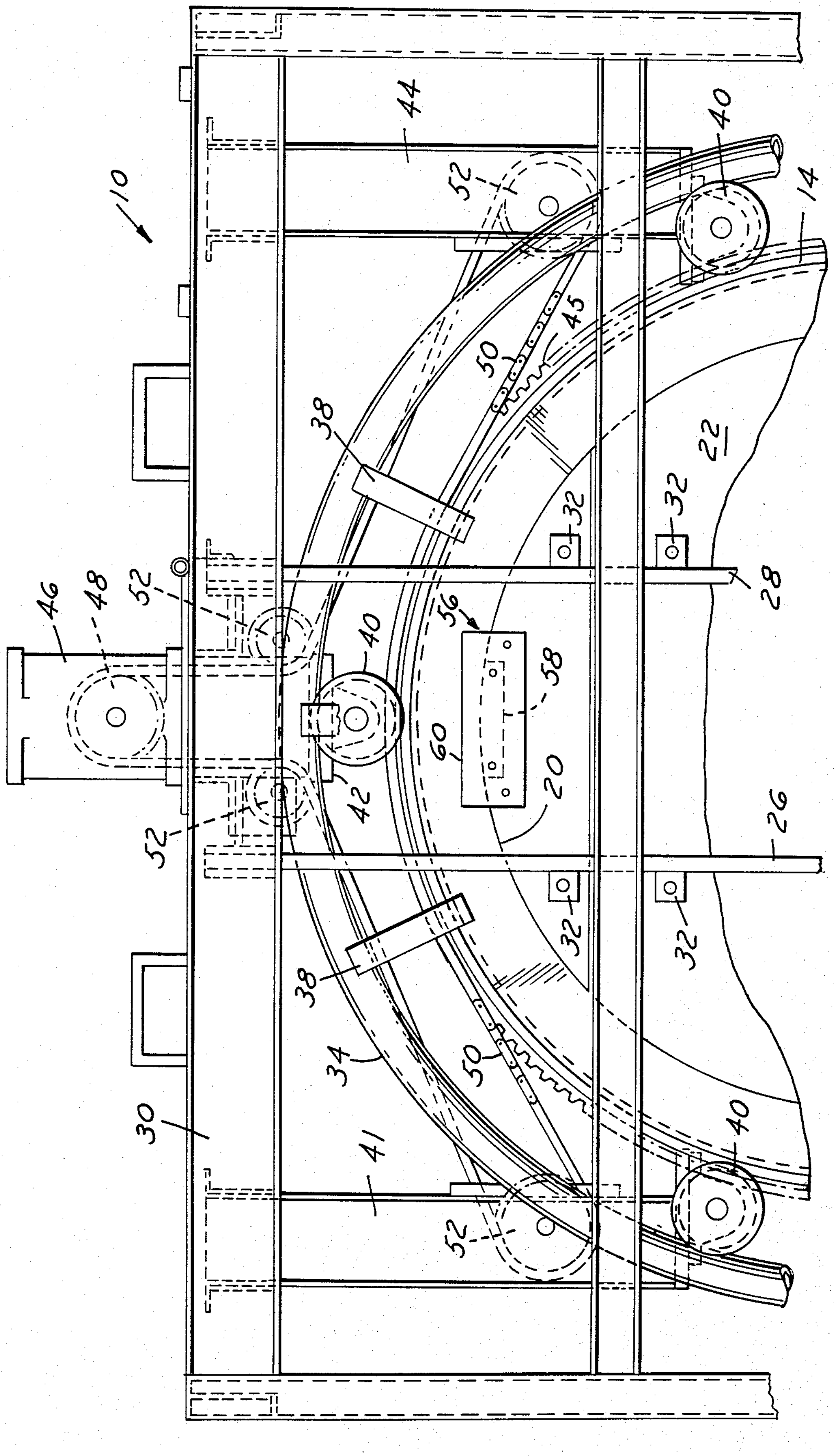
FIG. 3 is an enlargement of a portion of FIG. 1.
Figure 4:
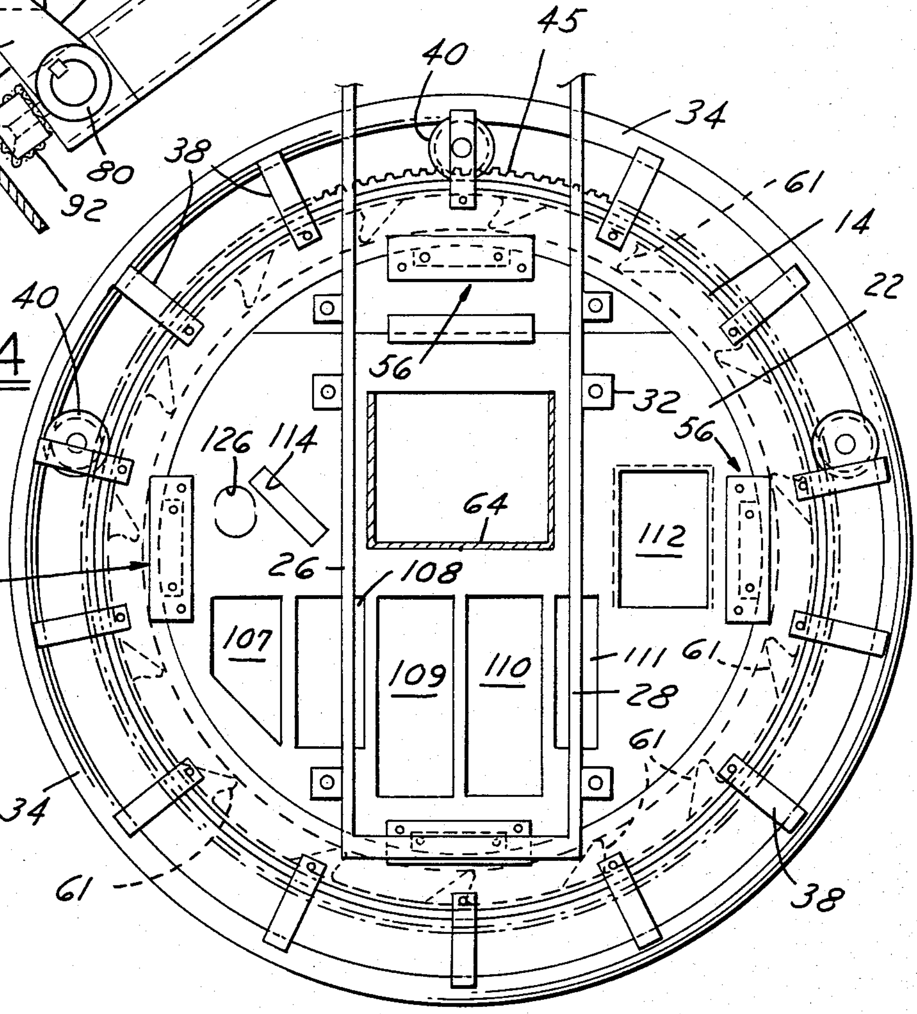
FIG. 4 is a view showing the barrel and the stationary end wall in greater detail than in FIG. 1, but with the tank and frame structure omitted for clarity.

The barrel is adapted to be rotated in one direction or the other about its longitudinal axis by means including reversible motor 46 mounted on the main frame (FIG. 3). The output sprocket 48 of the motor drives a chain 50 which is trained over idler sprockets 52 on the frame elements 41, 42 and 44 of the main frame and engages the teeth of sprocket or gear 45 extending about the outer periphery of the cylindrical wall 16 of the barrel (FIGS. 3, 4 and 6). The barrel is thus driven in rotation in one direction or the other depending upon the direction of rotation of the motor 46.

As previously stated, the end walls 22, 24 fit within the end openings 20 of the barrel. The circular peripheries of the end walls are notched at spaced points where indicated at 54 (FIGS. 3–6). Retainers 56 are provided at these spaced points, each retainer having a mounting portion 58 fitted within a notch and a retaining portion 60 projecting radially outwardly from the periphery of the end wall upon which it is mounted. The retaining portions 60 overlap the radial walls 18 of the barrel and retain the barrel axially (FIGS. 3 and 6). The barrel is capable of free rotation with respect to the stationary end walls. The barrel including the end walls are made of a suitable plastic material such as polypropylene and are formed with a plurality of holes for the free passage of treating liquid into the barrel.

The barrel has a plurality of circumferentally spaced axially extending baffles 61 (FIG. 4) on the inner surface of its cylindrical wall 16 which extend radially inwardly and form an acute angle with the inner periphery such that when the barrel is rotated clockwise in FIG. 4 the articles are agitated and when the barrel is rotated counter-clockwise the baffles elevate the articles and cause them to drop. For a more complete description of the baffles and the manner in which they function during the rotation of the barrel in one direction or the other, attention is called to my prior U.S. Pat. Nos. 3,855,107, 3,926,666 and 4,390,399 the disclosures of which are incorporated herein by reference.

Figure 8:
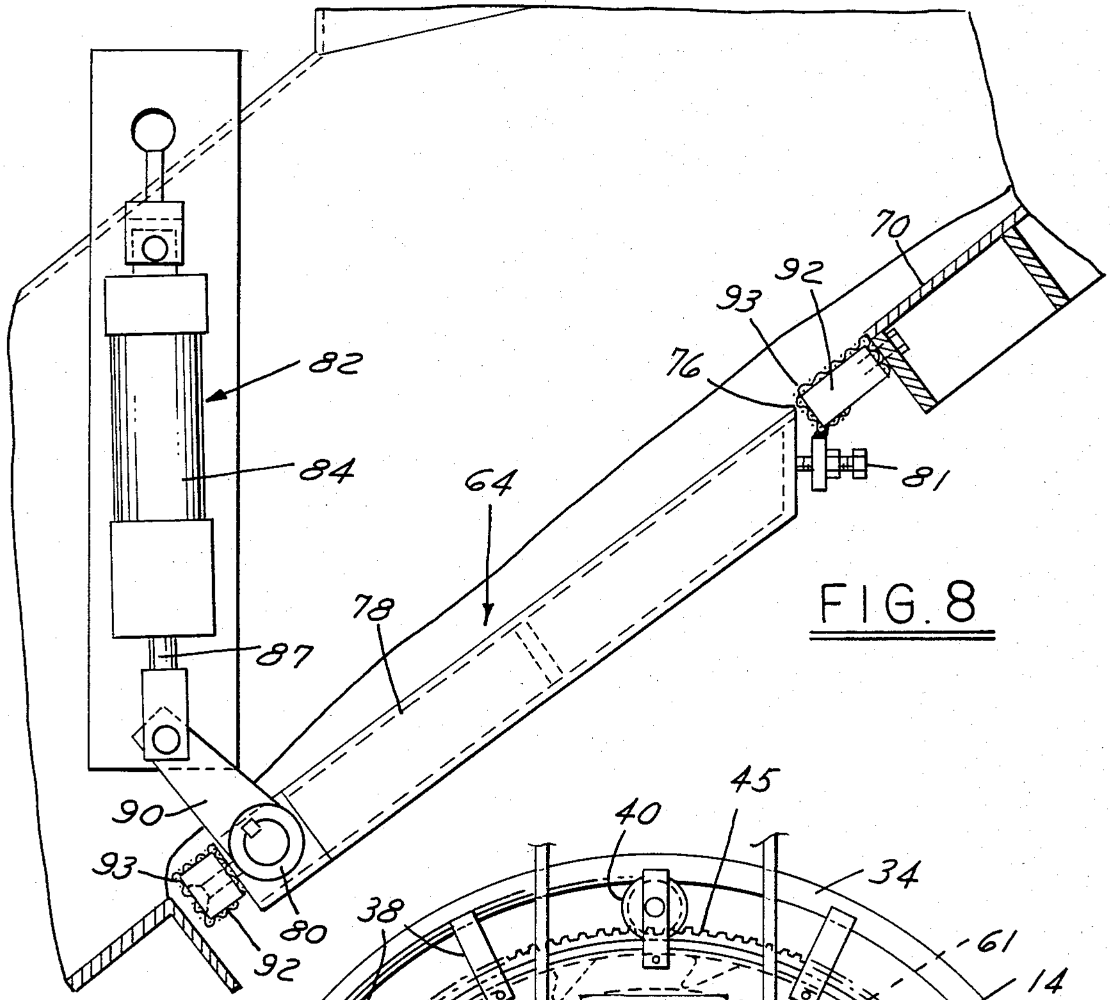
FIG. 8 is an enlarged view of portions of FIG. 7 to better illustrate the same.
Figure 7:
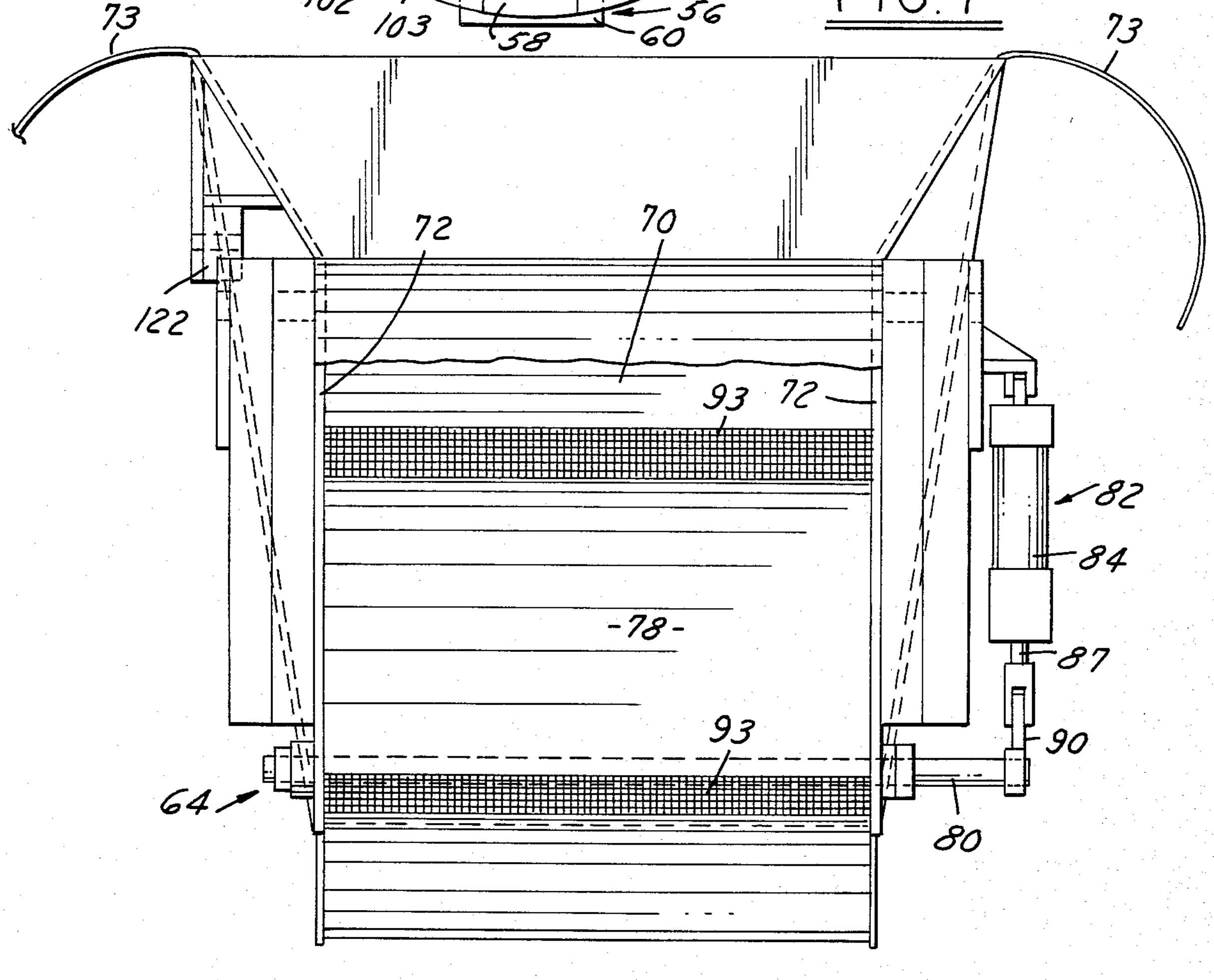
FIG. 7 is a sectional view taken on the line 7—7 in FIG. 6.

An elongated chute 64 is provided for the barrel extending through an opening in the end wall 22 (FIGS. 6–8). The chute extends from the interior of the barrel adjacent the end wall 24 through the end wall 22 to its discharge end adjacent the inlet 68 in the wall 24 of the barrel 14' in an adjacent tank assembly as seen in FIG. 6. The bottom wall 70 of the chute slopes downwardly from the interior of the barrel to the discharge end of the chute. Side walls 72 extend upwardly from the opposite side edges and inside the barrel the side walls have laterally outwardly projecting arcuate extensions 73 from their upper edges which deflect dropping articles and prevent them from becoming hung up on the upper edges of the side walls.

There is an opening 76 in a portion of the bottom wall 70 inside the barrel which extends the full width of the bottom wall (FIGS. 6 and 8). A closure 78 is provided for the opening. The closure 78 has a horizontal pivot shaft 80 at its lower end near the end wall 22 which is pivoted to the side walls to permit the closure to swing from the closed position shown in FIGS. 6 and 8 to the open dotted line position of FIG. 6. Any suitable means such as the fluid piston-assembly 82 (FIGS. 7 and 8) may be provided for swinging the closure between open and closed positions. The cylinder 84 of the assembly 82 is mounted on the side of the chute and the rod 87 extending from the piston within the cylinder has a pivotal connection with one end of a crank arm 90 the other end of which is secured to the pivot shaft 80 of the closure. The closure is closed against adjustable stop 81 during the discharge of the articles from the barrel and is swung open during processing of the articles in the barrel so that any article accidentally dropping into the chute during processing will fall through the opening in the bottom wall back into the liquid in the container. When the closure is raised to the open dotted line of FIG. 6, it is disposed in a position blocking the discharge of articles.

The chute has means for inhibiting or restraining the loss or escape of liquid from the barrel by way of the chute, such restraining means comprising a pair of core members or supports 92 which extend across the full width of the bottom wall of the chute at points defining the upper and lower edges of the opening 76, each core member being wrapped with a mesh of woven stainless steel filamentary material 93 (FIGS. 7 and 8). When treating liquid running down the chute comes in contact with the mesh, the capillary action of the mesh soaks up the liquid and prevents it from passing out of the barrel through the chute.

Referring again to the end walls 22 and 24, these end walls have a plurality of openings 101–106 (FIG. 5) for the purpose of providing access to the barrel. These openings, which have apertures for the passage of the liquid in the container, are normally closed by removable panels 107–112.

Figure 2:
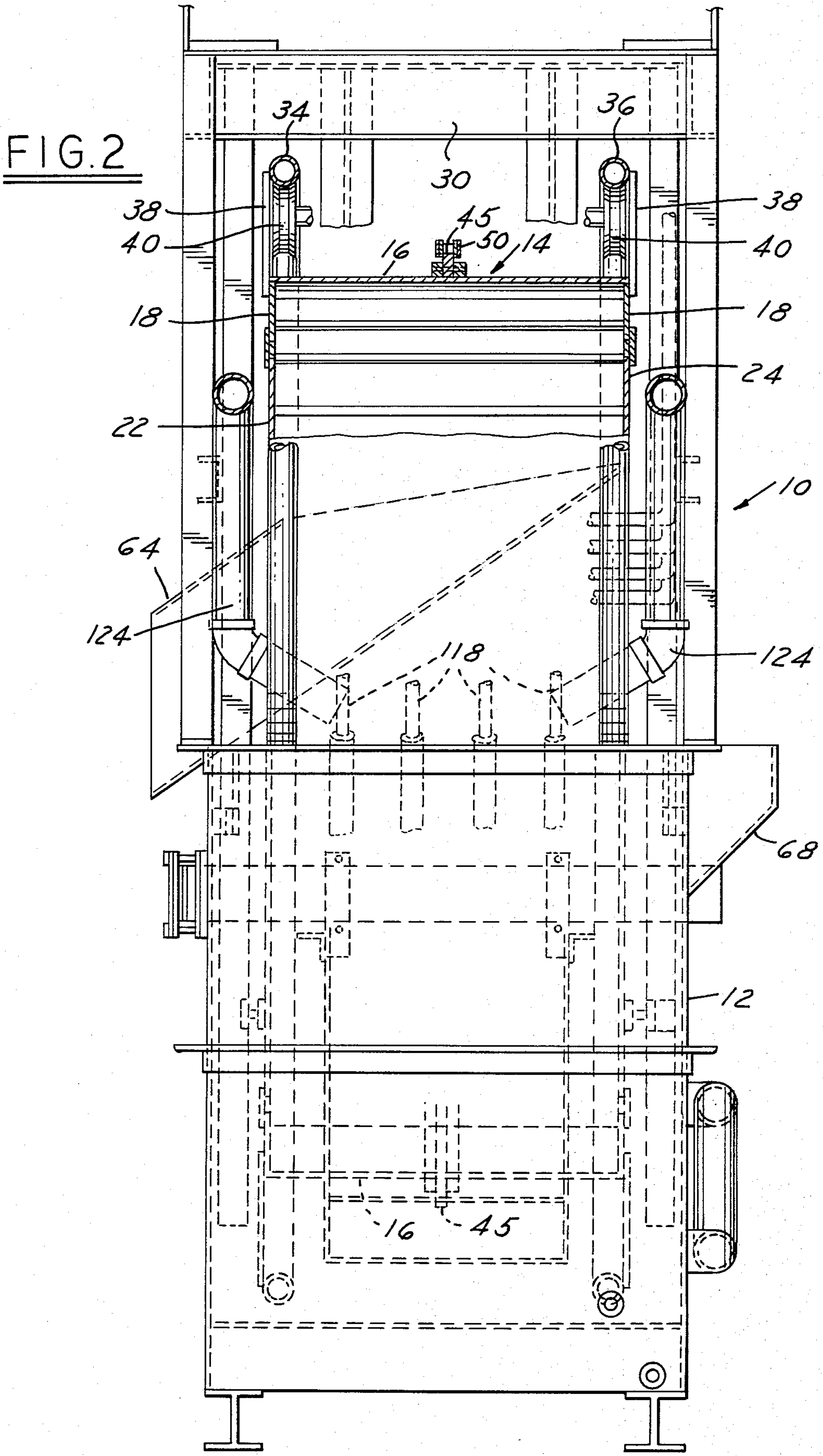
FIG. 2 is a view as seen from the right in FIG. 1, with parts in section.
Figure 5:
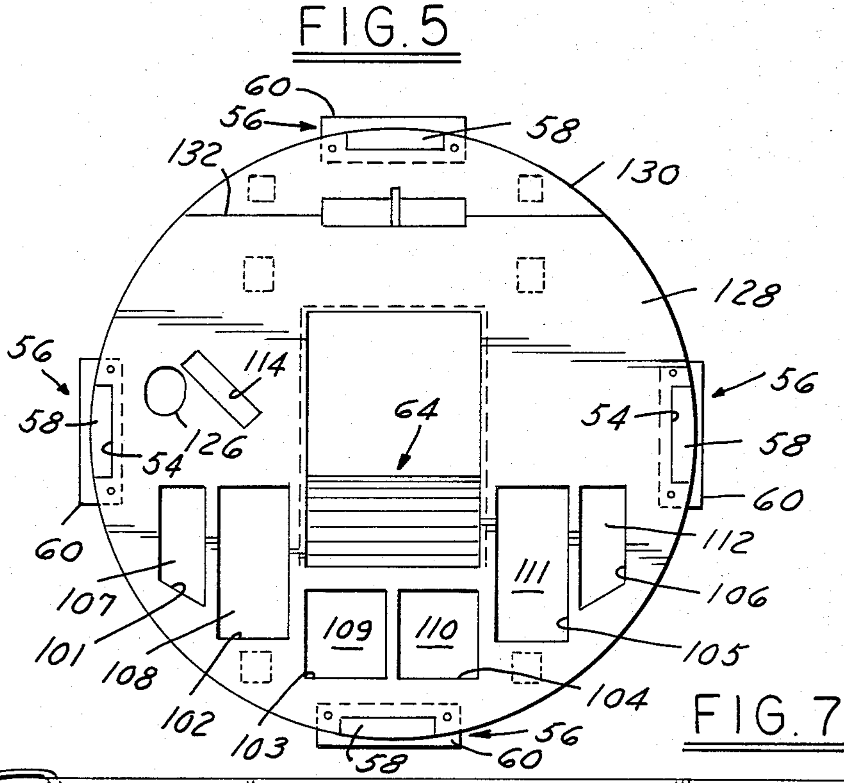
FIG. 5 is an elevation of one of the stationary end walls.

The end walls also have openings 114 through which extend the electrical cables 116 to the cathrodes 118 and anode 120 within the barrel. The anode is in the form of a basket supported on the chute by insulating blocks 122. The anode basket 120 is adapted to contain plating elements, in this instance zinc balls, which may be fed to the basket from the outside by means of conduits 124 extending through suitable openings 126 in the end walls (FIGS. 1, 2 and 5).

The end wall 24 has an inlet 68 (FIG. 6) through which articles may be introduced into the barrel. Both end walls may be made of two sections 128 and 130 as shown in FIG. 5 meeting on the line 132 and rigidly secured to one another.

The stationary end walls make it possible to employ a larger and more efficient chute. Also it is possible to place a large capacity anode basket inside the barrel, allowing the plating time to be substantially shortened. The zinc balls are fed by conduits through openings in the stationary end walls and the electrical cables extend through openings in the end walls. It is possible to apply up to 3,000 amperes of current to the parts in the practice of the present invention.

An eccentric vibrator 140 (FIG. 1) is provided for the barrel, mounted on the frame member 41. The vibrator contacts the flexible arm 142 which arm is connected at one end to the frame member 41 and has a roller 144 on the other end engaging the cylindrical outer wall 16 of the barrel. The barrel is not vibrated during processing of articles when the barrel is rotated clockwise in FIG. 4, but is vibrated during reverse rotation in the counter-clockwise direction so that articles will not stick to the barrel but will drop into the chute for transfer.

An eccentric vibrator 150 (FIG. 6) is provided for the chute, being mounted on the bottom wall 70 thereof. When operated, the vibrator causes the chute to vibrate, thereby facilitating the transfer of articles along the chute to the next barrel in the series. The vibrator 150 is not operated during processing when the barrel is rotated clockwise in FIG. 4, but is operated only when the barrel is rotated counter-clockwise for the transfer of articles to the next barrel.

In operation, a batch of articles is loaded into the barrel 14 through the inlet 68 either from a loading hopper or from the chute of an adjacent barrel. With the closure 78 in the raised or open position shown in dotted lines in FIG. 6, the barrel is rotated clockwise in FIG. 4 by motor 46 to agitate the articles. Any article accidently dropping into the chute will fall through the opening 76 in the bottom wall of the chute back into the liquid at the bottom of the barrel. The raised closure also is in a position blocking the discharge of articles. At the same time the articles are being processed in barrel 14, other batches of articles are being processed in other barrels in the series.

At the conclusion of the plating process in barrel 14, the drive motor 46 is reversed to rotate the barrel in the opposite direction, counter-clockwise in FIG. 4, causing the baffles to elevate the articles and drop them into the chute. During the reverse or counter-clockwise rotation of the barrel, the opening 76 in the bottom of the chute is closed by the closure 78 so that articles dropping into the chute will slide by gravity through the chute into the next adjacent barrel 14' for further processing. During the counter rotation of the barrel 14, the barrel and the chute are vibrated, the vibration of the barrel preventing articles from adhering to the cylindrical surface of the barrel 14 and the vibration of the chute facilitating the sliding transfer of articles through the chute into the next barrel.

I claim:

1. In an apparatus for cleaning, plating and/or coating articles, the combination comprising a container adapted to contain a liquid treatment material, a barrel adapted to be at least partially submerged in liquid in said container, said barrel having a longitudinal axis, means for rotatably supporting said barrel so that it is partially submerged in liquid in said container, said barrel having a plurality of circumferentially spaced baffles on the inner periphery thereof, said baffles extending radially inwardly and forming an acute angle with said inner periphery such that when said barrel is rotated in one direction, said baffles agitate the articles, and when said barrel is rotated in the opposite direction, said baffles elevate the articles and cause them to drop, laterally spaced stationary end walls mounted in fixed positions covering the ends of said barrel, and chute means extending from the interior of said barrel adjacent one end wall through an opening in the other end wall such as to receive articles dropped by the baffles by gravity and discharge them from the barrel.

2. The apparatus set forth in claim 1, wherein said barrel has end openings, and said end walls are formed to fit within said end openings.

3. The apparatus set forth in claim 1, wherein one of said end walls has an opening providing access to the interior of said barrel, and a removable panel closing said access opening.

4. The apparatus set forth in claim 1, wherein electrodes are provided in said barrel, and cables to said electrodes extend through an opening in one of said end walls.

5. The apparatus set forth in claim 1, wherein cathodes are provided in said barrel, an anode in the form of a basket for plating elements is mounted on said chute means in a position within said barrel, and cables to said cathodes and to said anode basket extend through openings in one of said end walls.

6. The apparatus set forth in claim 5, including a conduit for plating elements leading to said anode basket through an opening in one of said end walls.

7. In an apparatus for cleaning, plating and/or coating articles, the combination comprising a container adapted to contain a liquid treatment material, a barrel adapted to be at least partially submerged in liquid in said container, said barrel having a longitudinal axis, means for rotatably supporting said barrel so that it is partially submerged in liquid in said container, said supporting means comprising a ring, means mounting said ring on said barrel in concentric relation therewith, anti-friction means rotatably suspending said ring, said barrel having a plurality of circumferentially spaced baffles on the inner periphery thereof, said baffles extending radially inwardly and forming an acute angle with said inner periphery such that when said barrel is rotated in one direction, said baffles agitate the articles, and when said barrel is rotated in the opposite direction, said baffles elevate the articles and cause them to drop, and chute means extending from the interior of said barrel such as to receive articles dropped by the baffles by gravity and discharge them from the barrel.

8. The apparatus set forth in claim 7, wherein said support means includes a second ring axially spaced from the first mentioned ring, means mounting said second ring on said barrel in concentric relation therewith, and anti-friction means rotatably suspending said second ring.

9. The apparatus set forth in claim 8, wherein said anti-friction means for rotatably suspending said rings includes rollers engaging said rings at points above the liquid in said container, and fixed frame means on which said rollers are mounted for free rotation.

10. The apparatus set forth in claim 9, including means for vibrating said barrel while it is rotating in said opposite direction.

11. In an apparatus for cleaning, plating and/or coating articles, the combination comprising a container adapted to contain a liquid treatment material, a barrel adapted to be at least partially submerged in liquid in said container, said barrel having a longitudinal axis, means for rotatably supporting said barrel so that it is partially submerged in liquid in said container, said barrel having a plurality of circumferentially spaced baffles on the inner periphery thereof, said baffles extending radially inwardly and forming an acute angle with said inner periphery such that when said barrel is rotated in one direction, said baffles agitate the articles, and when said barrel is rotated in the opposite direction, said baffles elevate the articles and cause them to drop, and elongated chute means extending from the interior of said barrel adjacent one end thereof through an opening in the other end thereof such as to receive articles dropped by the baffles by gravity and discharge them from the barrel, said chute means having a bottom wall which slopes downwardly from the interior of said barrel towards the discharge end of said chute means, an opening in a portion of said bottom wall in the interior of said barrel, a closure for said opening in said portion of said bottom wall which is adapted to be closed during the discharge of articles from said barrel and to be open during processing so that any articles accidentally dropping into said chute means during processing will fall through said opening in said bottom wall back into the liquid in said container, and means for opening and closing said closure.

12. The apparatus set forth in claim 11, wherein said closure when open is disposed in a position blocking the discharge of articles.

13. The apparatus set forth in claim 11 or 12, including means for vibrating said chute means to facilitate the discharge of articles.

14. In an apparatus for cleaning, plating and/or coating articles, the combination comprising a container adapted to contain a liquid treatment material, a barrel adapted to be at least partially submerged in liquid in said container, said barrel having a longitudinal axis, means for rotatably supporting said barrel so that it is partially submerged in liquid in said container, said barrel having a plurality of circumferentially spaced baffles on the inner periphery thereof, said baffles extending radially inwardly and forming an acute angle with said inner periphery such that when said barrel is rotated in one direction, said baffles agitate the articles, and when the barrel is rotated in the opposite direction, said baffles elevate the articles and cause them to drop, and elongated chute means extending from the interior of said barrel adjacent one end thereof through an opening in the other end thereof such as to receive articles dropped by the baffles by gravity and discharge them from the barrel, said chute means having a bottom wall which slopes downwardly from the interior of said barrel towards the discharge end of said chute means, and means for restraining the loss of liquid from said container by way of said chute means.

15. The apparatus set forth in claim 14, wherein said restraining means comprises a mesh of filamentary material.

16. The apparatus set forth in claim 14, wherein said restraining means comprises a mesh of woven stainless steel filamentary material wrapped around a supporting core member.

17. In an apparatus for cleaning, plating and/or coating articles, the combination comprising a container adapted to contain a liquid treatment material, a barrel adapted to be at least partially submerged in liquid in said container, said barrel having a longitudinal axis, means for rotatably supporting said barrel so that it is partially submerged in liquid in said container, said supporting means comprising a ring, means mounting said ring on said barrel in concentric relation therewith, anti-friction means rotatably suspending said ring, said barrel having a plurality of circumferentially spaced baffles on the inner periphery thereof, said baffles extending radially inwardly and forming an acute angle with said inner periphery such that when said barrel is rotated in one direction, said baffles agitate the articles, and when said barrel is rotated in the opposite direction, said baffles elevate the articles and cause them to drop, laterally spaced stationary end walls mounted in fixed positions covering the ends of said barrel, and elongated chute means extending from the interior of said barrel adjacent one end wall through an opening in the other end wall such as to receive articles dropped by the baffles by gravity and discharge them from the barrel.

18. The apparatus set forth in claim 17, wherein said chute means has a bottom wall which slopes downwardly from the interior of said barrel toward the discharge end of said chute means, an opening in a portion of said bottom wall in the interior of said barrel, a closure for said opening in said portion of said bottom wall which is adapted to be closed during the discharge of articles from said barrel and to be open during processing so that any articles accidentally dropping into said chute means during processing will fall through said opening in said bottom wall back into the liquid in said container, and means for opening and closing said closure.

19. The apparatus set forth in claim 18, wherein said barrel has end openings and said end walls are formed to fit within said end openings.

20. The apparatus set forth in claim 19, wherein cathodes are provided in said barrel, an anode in the form of a basket for plating elements is mounted on said chute means in a position within said barrel, cables to said cathodes and to said anode basket extend through openings in at least one of said end walls, and a conduit for plating elements leading to said anode basket through an opening in one of said end walls.

21. The apparatus set forth in claim 20, wherein said anti-friction means includes rollers engaging said ring at points above the liquid in said container, and fixed frame means on which said rollers are mounted for free rotation.

22. The apparatus set forth in claim 21, wherein said closure when open is disposed in a position blocking the discharge of articles.

23. The apparatus set forth in claim 22, including means for restraining the loss of liquid from said container by way of said chute means comprising a mesh of filamentary material.

24. The apparatus set forth in claim 23, including means for vibrating said barrel while it is rotating in said opposite direction and for vibrating said chute means to facilitate the discharge of articles.

25. In an apparatus for cleaning, plating and/or coating articles, the combination comprising a container adapted to contain a liquid treatment material, a barrel adapted to be at least partially submerged in liquid in said container, said barrel having a longitudinal axis, means for rotatably supporting said barrel so that it is partially submerged in liquid in said container, said barrel having a plurality of circumferentially spaced baffles on the inner periphery thereof, said baffles extending radially inwardly and forming an acute angle with said inner periphery such that when said barrel is rotated in one direction, said baffles agitate the articles, and when said barrel is rotated in the opposite direction, said baffles elevate the articles and cause them to drop, a stationary end wall mounted in fixed position covering one end of said barrel, and chute means extending from the interior of said barrel adjacent the opposite end thereof through an opening in said end wall such as to receive articles dropped by the baffles by gravity and discharge them from the barrel.

26. The apparatus set forth in claim 25, wherein said barrel has an end opening in said one end thereof, and said end wall is formed to fit within said end opening.

27. The apparatus set forth in claim 7, including a stationary end wall mounted in fixed position covering one end of said barrel, said chute means extending from the interior of said barrel adjacent the opposite end thereof through an opening in said end wall to the exterior of said barrel.

28. The apparatus set forth in claim 7, including laterally spaced stationary end walls mounted in fixed positions covering the ends of said barrel, said chute means extending from the interior of said barrel adjacent one end wall thereof through an opening in the other end wall to the exterior of said barrel.

* * * * *